July 11, 1939.     E. H. HALL     2,166,004
CLUTCH FOR DIE PRESS OR THE LIKE
Filed Aug. 4, 1938     2 Sheets-Sheet 2
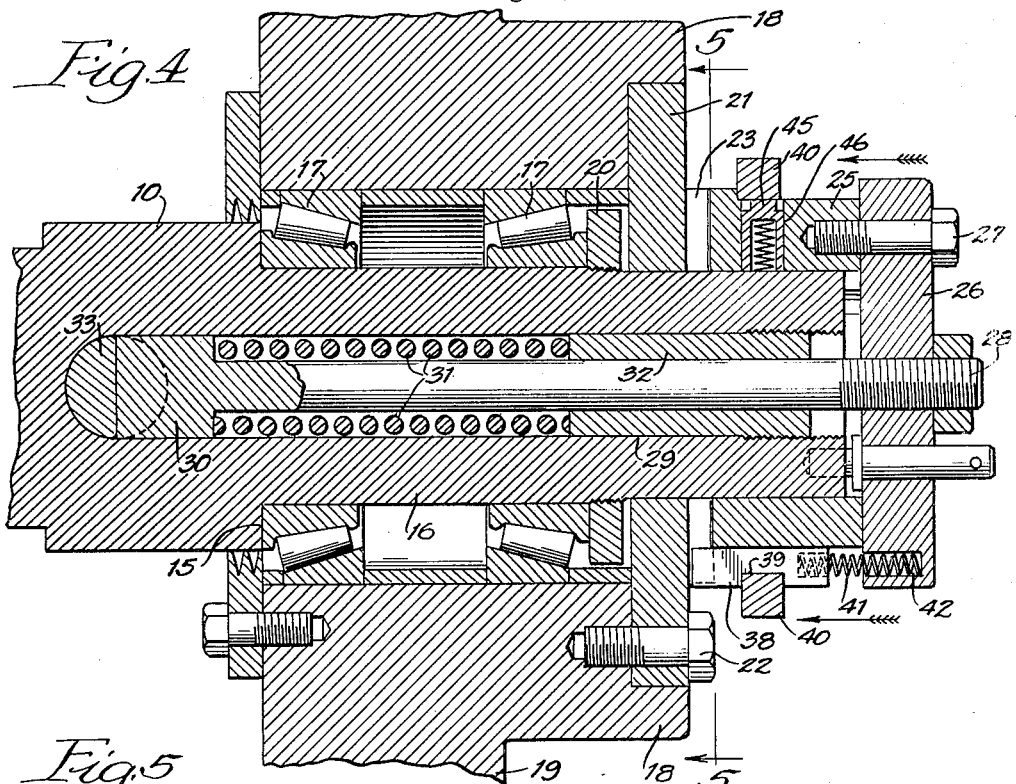
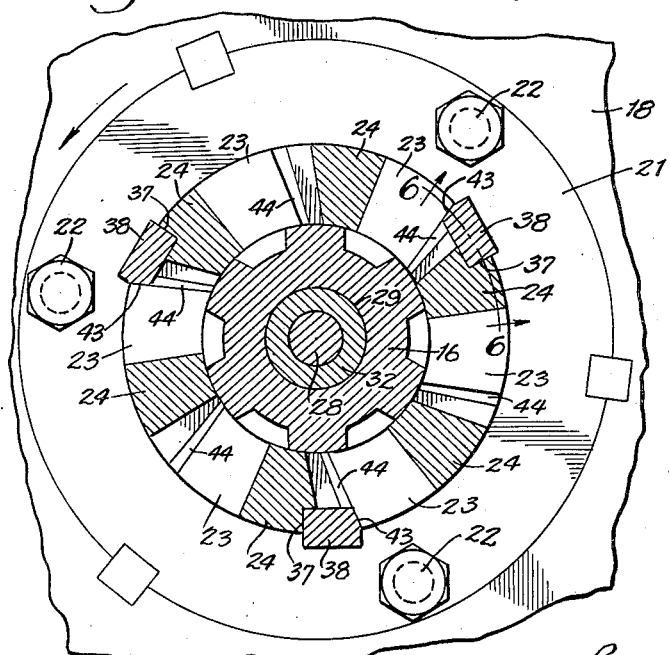
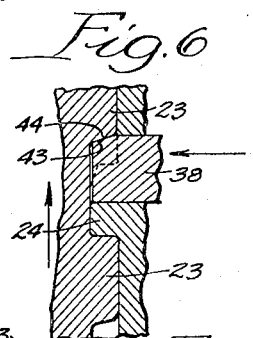
Inventor
Edward H. Hall
By Bunning & Bunning
Attorneys Patented July 11, 1939

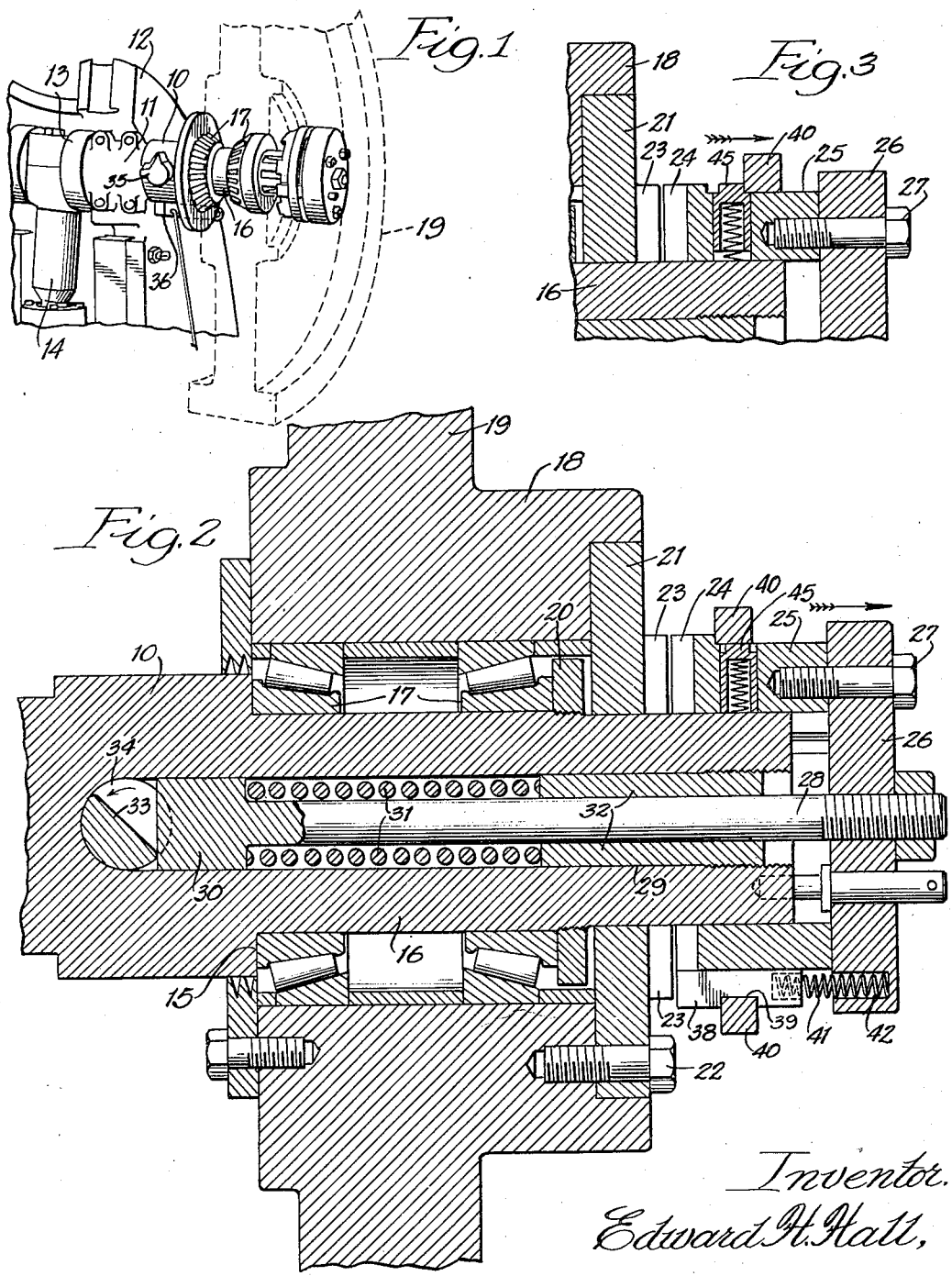

2,166,004

UNITED STATES PATENT OFFICE 2,166,004

CLUTCH FOR DIE PRESS OR THE LIKE

Edward H. Hall, Chicago, Ill.

Application August 4, 1938, Serial No. 223,088

4 Claims. (Cl. 192—24)

The clutch of the present invention is designed primarily for use in the transmission of power from the constantly rotating fly wheel of a punch press or the like to the crank shaft with which the die head is connected, and for this special purpose is designed so as to permit the driving and driven elements to be loosely clutched together in the first instance and thereafter locked immovably to one another.

By disabling the mechanism which provides for the final rigid locking of the parts together, it is possible to provide sufficient lost motion and consequent freedom of movement of the fly wheel to permit it to be oscillated back and forth by the operator to the extent required in adjusting the dies or other tools, after which the parts may be regidly locked together in preparation for the regular operation of the machine.

Further objects and details will appear from a description of the invention in conjunction with the accompanying drawings, wherein, Figure 1 is a perspective view of the bearings and associated parts with the fly wheel removed;

Fig. 2 is a longitudinal sectional elevation of the fly wheel hub, bearings and shaft, with the clutching elements in unclutched relation;

Fig. 3 is a detail showing the means provided for disabling the operation of the locking wedges;

Fig. 4 is a view similar to Fig. 2 showing the wedges and clutch elements in clutching relation;

Fig. 5 is a cross sectional view taken on line 5—5 of Fig. 4;

Fig. 6 is a sectional detail taken on the arcuate line 6—6 of Fig. 5 showing the clutch teeth and associated wedge in locking position; and Fig. 7 is a perspective view of one of the wedges.

The clutch elements of the present invention are shown as applied to the crank shaft of a punch press, the upper portion of which is illustrated in Fig. 1. As shown, the crank shaft 10 is journalled within bearings 11 carried by the upper frame 12 of the punch press, and the shaft is provided with the usual crank 13 driving a plunger 14, or any other suitable or conventional tool or device.

The shaft 10 is shouldered at the point 15 to provide a reduced outer section 16 which carries roller bearings 17 which serve to mount the hub 18 of a fly wheel 19. The roller bearings, as shown, are of the type known as the Timken roller bearing, and they are held in position by a ring 20 which is threaded onto the outer end of the shaft which is slightly reduced beyond the threading to permit the ring 20 to be slipped inwardly upon the shaft to engage the threads thereon.

The hub 18 carries an inwardly projecting ring disk 21 which is socketed within the outer face of the hub and held securely thereon by bolts 22. The inner margin of the ring disk closely encircles the outer end of the shaft 10. The ring disk 21 is provided on its outer face with a series of clutch teeth 23 which constitute the driving clutch elements in the exemplification of the invention here shown, and these teeth coact with a series of driven clutch teeth 24 on the inner face of a clutch mounting in the form of a ring collar 25 which is slidably keyed upon the outer reduced end of the shaft 10 so as to be adjustable thereon but rotatable with the shaft.

The outer end of the ring collar 25 is closed by a cap plate 26 secured to the ring collar by bolts 27. The cap plate is actuated by a plunger rod 28 which extends axially through a bore 29 in the shaft 10 and terminates at its forward end in an enlarged head 30 which closely fits within the bore. The plunger rod is encircled by a coil spring 31 and is entered through a bushing 32 threaded into the outer end of the bore 29, the arrangement being such as to permit the plunger rod 28 to be moved rearwardly under increasing spring pressure, thus retracting the ring collar 25 and the clutch elements associated therewith.

In order to impart axial movements to the plunger rod 28, a rotatable cam 33 is provided, which as shown constitutes the half cylindrical section of a rotatable transverse rock shaft 34 which extends transversely through an aperture in the shaft 10, and is provided on its projecting end with a trip finger 35 adapted to be engaged by a trip arm 36 where it is desired to automatically trip the clutch at a desired interval. If automatic tripping is not desired, the trip finger 35 may be manually operated.

The cam 33 is so positioned that when turned to present its arcuate face into contact with the head of the plunger it will impart an outward thrust, but when turned to present its flat face thereto it will permit the plunger to move inwardly under the thrust of the spring 31. Thus when the cam 33 stands in the position shown in Fig. 2, the clutch teeth 24 and 23 will be out of engagement, but when the cam is moved to the position shown in Fig. 4, the clutch teeth will move into engagement.

The driven clutch teeth 24 are narrower than the spaces between the driving clutch teeth 23, 2,166,004 so that when the teeth are moved into clutching relation the spaces will not be filled by the driven teeth 24, and considerable play or lost motion will be present, which in certain circumstances is desirable in order to permit the fly wheel to be manually rocked or moved to a limited extent in the preliminary adjustment of the dies or other tools which are employed in connection with the punch press.

It is desirable, however, to provide wedging means for taking up the lost motion at the proper time and in order to afford a close locking engagement between the driving and driven elements, and for this purpose the ring collar 25 is provided at recurrent intervals with grooves 37, which as shown are three in number, each of which receives a slidable wedge 38 having on its outer face a notch 39 engaged by a ring 40 which is adapted to retract all of the wedges in unison against the thrust of springs 41 which bear against the respective wedges and have their outer ends socketed within recesses 42 in the cap plate 26.

The inner end of each of the wedges is beveled on one of its faces 43 to effect a close wedging fit with the proximate beveled face 44 of the contiguous driving tooth 23. Thus when the wedges are thrust inwardly they will fill up the gaps between the clutch teeth and effect a tight driving union between the clutch elements.

In order to permit the wedges to be temporarily disabled so that the fly wheel may be rocked or oscillated, the ring collar 25 is provided with one or more spring pressed latch plugs 45, each of which occupies a radial bore 46 in the ring collar 25. These latches normally occupy a position immediately beneath the wedge adjusting ring 40. However, when the wedge ring has been retracted to the fullest extent to withdraw the wedges, it will attain a position beyond the latch plug or plugs, which are thus thrust outwardly as in Fig. 3, to block the return movement of the ring 40. This holds the wedges in retracted position and disables their operation for the time being.

By providing a ring collar which is slidably keyed upon the end of the driven shaft as the mounting for the driven clutch teeth, and by providing a cap or the like beyond the end of the shaft and securing the ring collar thereto, a mounting is provided which embraces and encloses the end of the shaft and is so arranged that it can be operated by an axially positioned plunger rod, thereby greatly simplifying the means provided for actuating the clutch elements.

By locating the parts in the manner stated, the structure is self-contained, so that it is not necessary to provide connections leading to the frame or support of the machine as a means for mounting the clutch elements. Furthermore, the clutch can be opened or closed as the case may be, either manually or automatically, by a quarter turn of the cam 33 which moves the plunger 28 in the desired direction.

By providing the wedges for operation in association with the clutch teeth, adequate provision is made for bringing the clutch elements into tightly locked relationship when it is desired to impart power to the shaft and after the necessary adjustment has been made during the period while the wedges are retracted and disabled.

The shaft, therefore, with the fly wheel and associated parts, provides a compact, unified, and self-contained structure, providing in full for the necessary adjustments required in mechanism of this character.

Although the invention has been described with particularity as to detail, it is not the intention unless indicated in the claims to limit the invention to the particular form of construction shown, since modifications therein may be made without departing from the spirit of the invention.

I claim:

1. In a clutch mechanism of the class described, the combination of a shaft provided on its interior with an axial bore, a clutch member slidably but non-rotatably mounted upon the exterior of the shaft and provided with clutch teeth, a plunger rod slidably mounted within the bore in the shaft and connected at its outer end with the clutch member for actuating the same, a member rotatably mounted upon the shaft and provided with clutch teeth adapted to coact with the clutch teeth first mentioned, eccentric means carried by the shaft and engaging the inner end of the plunger rod for actuating the same to engage or disengage the clutch teeth, the associated clutch teeth providing a loose fit affording lost motion, wedges carried by the slidable clutch element and adapted when moved to fill the spaces between the clutch teeth and effect a locking engagement of the parts, and means for holding the wedges in retracted relation to permit limited rocking movements while the clutch teeth are in engaging relation.

2. In clutch mechanism of the class described, the combination of a shaft provided on its interior with an axial bore, a clutch member slidably but non-rotatably mounted upon the exterior of the shaft and provided with clutch teeth on its inner face, a plunger rod slidably mounted within the bore in the shaft and connected at its outer end with the clutch member for actuating the same, a member rotatably mounted upon the shaft and provided with clutch teeth on its outer face adapted to coact with the clutch teeth first mentioned, eccentric means carried by the shaft and engaging the inner end of the plunger rod for actuating the same to engage or disengage the clutch teeth, the associated clutch teeth providing a loose fit affording lost motion, wedges carried by the slidable clutch element and adapted when moved to fill the spaces between the clutch teeth and effect a locking engagement of the parts, and means for holding the wedges in retracted relation to permit limited rocking movements while the clutch teeth are in engaging relation.

3. In clutch mechanism of the class described, the combination of a shaft provided on its interior with an axial bore, a clutch member slidably but non-rotatably mounted upon the exterior of the shaft and provided with clutch teeth, a plunger rod slidably mounted within the bore in the shaft and connected at its outer end with the clutch member for actuating the same, a member rotatably mounted upon the shaft and provided with clutch teeth adapted to coact with the clutch teeth first mentioned, means for moving the plunger rod to engage and disengage the clutch teeth, the associated clutch teeth providing a loose fit affording lost motion, wedges carried by the slidable clutch member and adapted when moved to fill the spaces between the clutch teeth and effect a locking engagement of the parts, and a ring slidably mounted upon the slidable clutch member and engaging the wedges and adapted when moved to retract the same to permit limited rocking movements while the clutch teeth are in engaging relation.

4. In clutch mechanism of the class described, the combination of a shaft provided on its interior with an axial bore, a clutch member slidably but non-rotatably mounted upon the exterior of the shaft and provided with clutch teeth, a plunger rod slidably mounted within the bore in the shaft and connected at its outer end with the clutch member for actuating the same, a member rotatably mounted upon the shaft and provided with clutch teeth adapted to coact with the clutch teeth first mentioned, means for moving the plunger rod to engage and disengage the clutch teeth, the associated clutch teeth providing a loose fit affording lost motion, wedges carried by the slidable clutch member and adapted when moved to fill the spaces between the clutch teeth and effect a locking engagement of the parts, and a ring slidably mounted upon the slidable clutch member and engaging the wedges and adapted when moved to retract the same to permit limited rocking movements while the clutch teeth are in engaging relation, and a latch member carried by the slidable clutch member and adapted when the ring is retracted to its extreme position to engage the ring and hold the same in retracted position.

EDWARD H. HALL.